Nov. 2, 1954 W. FRED 2,693,061
GRINDING MACHINE
Filed March 20, 1953 2 Sheets-Sheet 1

INVENTOR.
WALTER FRED
BY
Harold W. Eaton
ATTORNEY

Nov. 2, 1954  W. FRED  2,693,061
GRINDING MACHINE
Filed March 20, 1953  2 Sheets-Sheet 2

INVENTOR.
WALTER FRED
BY
Harold W. Eaton
ATTORNEY

United States Patent Office 2,693,061
Patented Nov. 2, 1954

2,693,061

GRINDING MACHINE

Walter Fred, Worcester, Mass., assignor to Norton Company, Worcester, Mass., a corporation of Massachusetts Application March 20, 1953, Serial No. 343,773

6 Claims. (Cl. 51—105)

The invention relates to grinding machines, and more particularly to a work piece locating mechanism therefor.

One object of the invention is to provide a simple and thoroughly practical work locating mechanism axially to position a rotatable work piece relative to its supporting chucks and the grinding wheel. Another object is to provide a work locating mechanism for positioning a work piece having spaced shouldered portions thereon in an axial direction to position the portion of the work to be ground into alignment with the operative face of the grinding wheel to facilitate equalizing the side grinding of the wheel on spaced shouldered portions on the work piece. Another object is to provide a movable work locating device for moving the work piece axially within the supporting work chucks to align the portion of the work to be ground relative to the transversely movable grinding wheel. Another object of the invention is to provide a work locating apparatus including a rotatable cam engageable with spaced shouldered faces on a work piece axially to position the work piece relative to the grinding wheel. A further object is to provide a hydraulically actuated cam mechanism axially to position a spaced shouldered portion on a work piece relative to the grinding wheel so as to equalize the side grinding of the wheel on the spaced shoulders. Other objects will be in part obvious or in part pointed out hereinafter.

In the accompanying drawings in which is shown various possible embodiments of the mechanical features of the invention:

Figure 1:
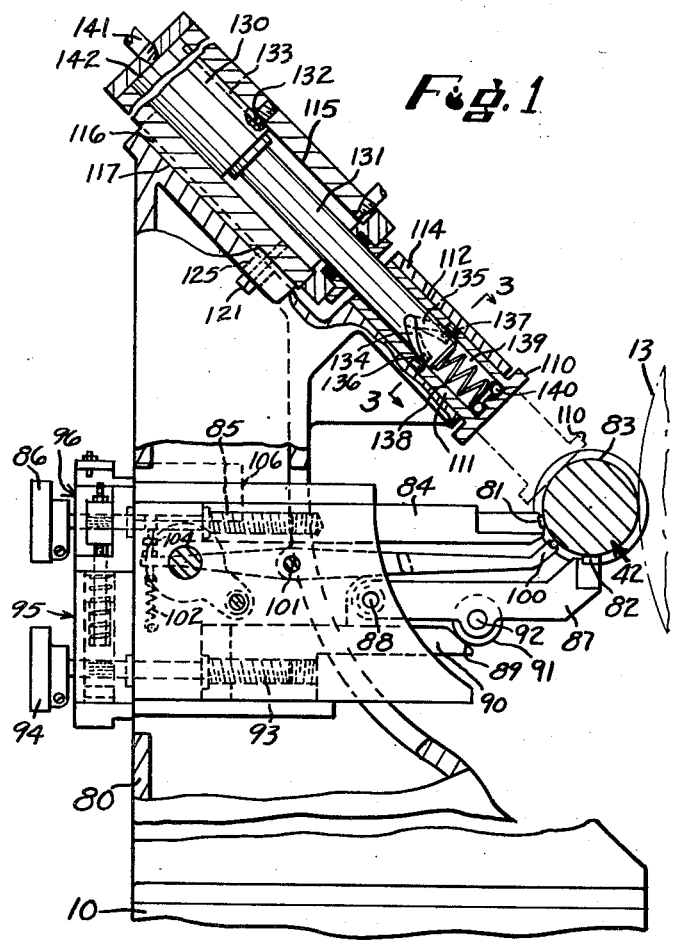
Fig. 1 is a side elevation of a steady rest, showing the crankshaft positioning mechanism in section.

This invention is particularly applicable to a crankpin grinding machine, such as, that shown in the prior U. S. patent to H. A. Silven No. 2,151,666, dated March 21, 1939, to which reference may be had for details of disclosure not contained herein.

As illustrated in the drawings, a machine base 10 serves as a support for a transversely movable wheel slide 11 having a rotatable wheel spindle 12 suitably journalled therein in bearings (not shown). The wheel spindle 12 serves as a support for a grinding wheel 13 which is arranged to grind a cylindrical portion on a work piece, such as the crankpin or main bearings of a crankshaft to be ground.

A suitable driving mechanism is provided for the grinding wheel 13 comprising a motor 14 mounted on the upper surface of the wheel slide 11. The motor 14 is provided with a motor shaft 15 having a multiple V-grooved pulley 16 thereon. The pulley 16 is connected by multiple V-belts 17 with a multiple V-grooved pulley 18 mounted on the right hand end of the wheel spindle 12 (Fig. 5).

A feeding mechanism is provided for imparting a transverse feeding movement to the grinding wheel slide 11. This mechanism may comprise a half nut 20 fixedly mounted on the underside of the wheel slide 11. The half nut 20 meshes with or engages a rotatable feed screw 21 which is rotatably supported in bearings (not shown) in the base 10. A power operated mechanism is provided for rapidly moving the wheel slide to and from an operative position. This mechanism may comprise a piston 22 which is slidably mounted within a cylinder 23. The piston 22 is connected to one end of a piston rod 24, the other end of which is connected to the end of the feed screw 21. The piston 22 and the piston rod 24 are preferably arranged in axial alignment with the feed screw 21.

A control valve 25 is provided for controlling the admission to and exhaust of fluid from the cylinder 23. The control valve 25 is preferably a piston type valve comprising a valve stem 26 having a plurality of spaced valve pistons 27, 28, 29 and 30 formed integrally therewith. The valve pistons 27, 28, 29 and 30 form a plurality of valve chambers 31, 32 and 33. A compression spring 35 serves normally to maintain the valve stem 26 in a right hand end position (Fig. 5). A solenoid S2 is provided which when energized serves to shift the valve stem 26 toward the left into a reverse position.

Figure 5:
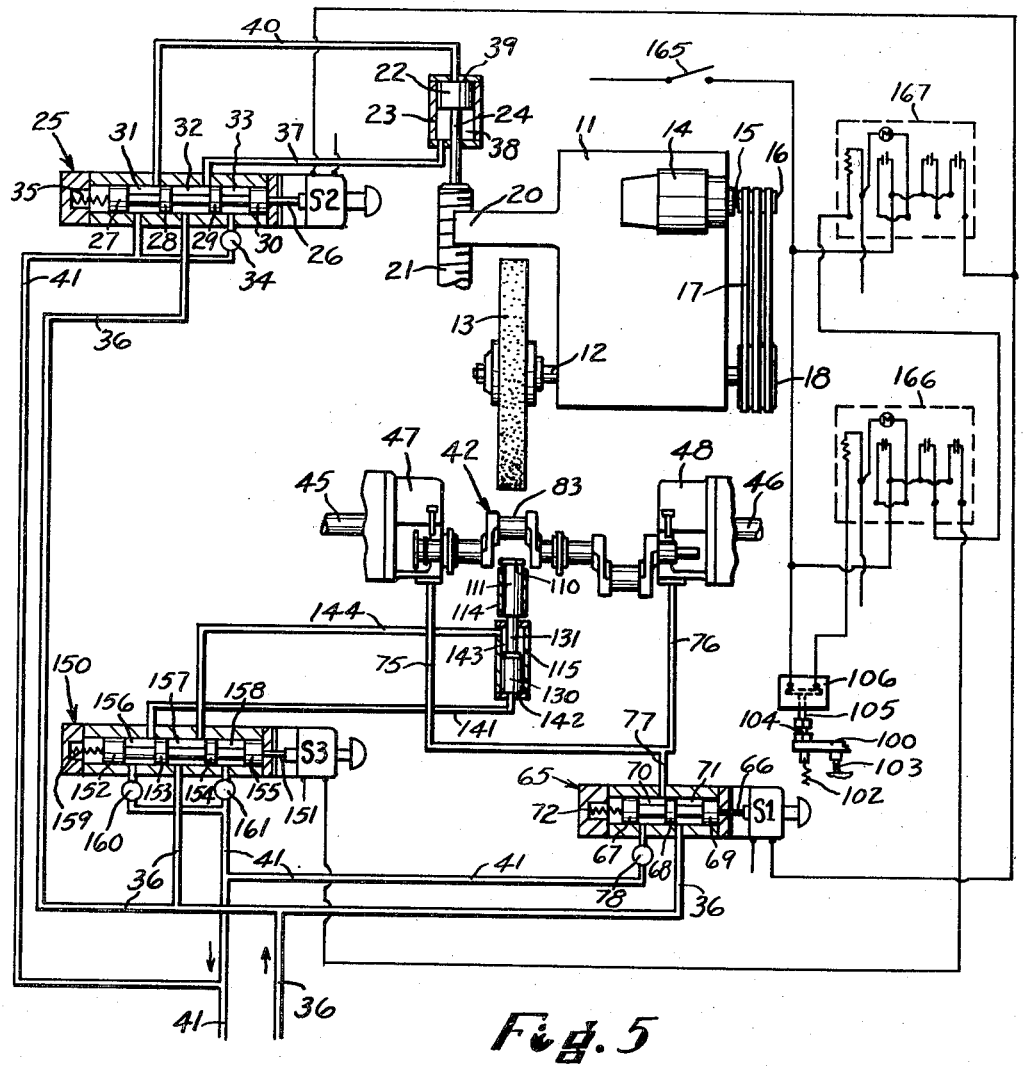
Fig. 5 is a combined hydraulic and electric diagram of the actuating mechanisms and the controls therefor.

In the position of the valve 25 (Fig. 5) fluid under pressure from a suitable source is passed through the valve chamber 32 and passes through a pipe 37 into a cylinder chamber 38 to move the piston 22 upwardly into the position shown in Fig. 5 so as to retract the wheel slide 11 to a rearward or inoperative position. During this movement of the piston 22, fluid within a cylinder chamber 39 may exhaust through a pipe 40, through the valve chamber 31 and out through an exhaust pipe 41.

When the solenoid S2 is energized, the valve stem 26 is moved toward the left (Fig. 5) to shift the valve into a reverse position so that fluid under pressure entering the valve chamber 32 will pass through the pipe 40 to the cylinder chamber 39 to cause a downward movement of the piston 22 (Fig. 5) so as to impart a rapid approaching movement of the wheel slide 11 and the grinding wheel 13. During the forward movement of the wheel slide 11, fluid within the cylinder chamber 38 is exhausted through the pipe 37, through the valve chamber 33 and out through a throttle valve 34 into the exhaust pipe 41. The throttle valve 34 serves to control the rate of the approaching movement of the wheel slide 11 and the grinding wheel 13 toward the crankshaft 42 to be ground.

A manually operable mechanism may be provided, if desired, for rotating the feeding screw 21 to impart a feeding movement to the wheel slide 11 and the grinding wheel 13. This mechanism may be any of the well known feeding mechanisms such as for example that shown in the above mentioned patent.

The base 10 also serves as a support for rotatably supporting a workpiece, such as, a crankshaft 42 to be ground. As illustrated in the drawings a pair of spaced axially-aligned rotatable work spindles 45 and 46 are provided. A pair of pot chucks 47 and 48 are mounted on the adjacent ends of the work spindles 45 and 46. The pot chucks 47 and 48 serve rotatably to support the opposite ends of the crankshaft 42 to be ground.

Figure 4:
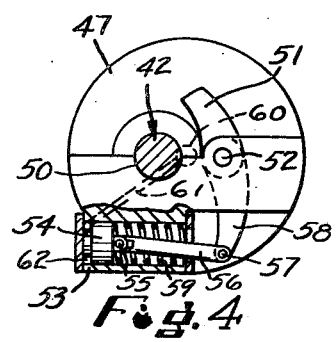
Fig. 4 is an elevation, partly in section, of one of the work supporting pot chucks.

The pot chucks 47 and 48 are identical in construction, consequently only the pot chucks 47 has been illustrated in detail in Fig. 4. The pot chuck 47 is provided with a fixed half bearing 50 for supporting one end of the crankshaft 42 to be ground. The pot chuck 42 is provided with a clamping jaw 51 pivotally supported by a stud 52. A hydraulically operated mechanism is provided for actuating the clamping jaw 51 comprising a cylinder 53 fixedly mounted on the pot chuck 47. The cylinder 53 contains a slidably mounted piston 54 which is connected by a stud 55 with one end of a link 56. The other end of the link 56 is connected by a stud 57 with a downwardly projecting portion 58 of the clamping jaw 51. A compression spring 59 contained within the cylinder 53 serves normally to hold the piston 54 in an extreme left hand end position normally to maintain the clamping jaw 51 in an unclamped position.

When it is desired to clamp the crankshaft 42 into the pot chucks 47 and 48, fluid under pressure is passed through a passage 60 formed within the spindles 45 and 46 respectively, through a passage 61 into a cylinder chamber 62 to cause the piston 54 to move toward the right (Fig. 4) so as to rock the clamping jaw 51 in a counter-clockwise direction to clamp the ends of the crankshaft 42 in engagement with the bearing surfaces 50.

A control valve 65 is provided for controlling the admission to and exhaust of fluid from the pot chuck cylinders 53. The valve 65 is preferably a piston type valve comprising a valve stem 66 having a plurality of spaced valve pistons 67, 68 and 69 formed integrally therewith so as to form spaced valve chambers 70 and 71. A compression spring 72 serves normally to maintain the valve stem 66 in a right hand end position. A solenoid S1 is operatively connected to the valve stem 66 and serves when energized to shift the valve stem 66 toward the left to reverse the flow of fluid. In the position of the valve 65 (Fig. 5) fluid under pressure passing through the pipe 36 enters the valve chamber 71 and is blocked therein. The released compression of the springs 59 within the pot chucks 47 and 48 serves to exhaust fluid from the cylinder chambers 62, through pipes 75 and 76 respectively, through a pipe 77, through the valve chamber 70 and out through the common exhaust pipe 41. A throttle valve 78 is provided in the pipe line 41, adjacent to the control valve 66 to facilitate controlling the rate of exhaust of fluid from the pot chuck cylinders 53.

When the solenoid S1 is energized, the valve stem 66 is shifted to the extreme left hand end position so that fluid under pressure from the pipe 36 enters the valve chamber 71 and passes through the pipe 77, through the pipes 75 and 76 into the pot chuck cylinders 53 so as to rock the clamping jaws 51 in a counter-clockwise direction to clamp the ends of the crankshaft 42 within the pot chucks 47 and 48 respectively.

Figure 2:
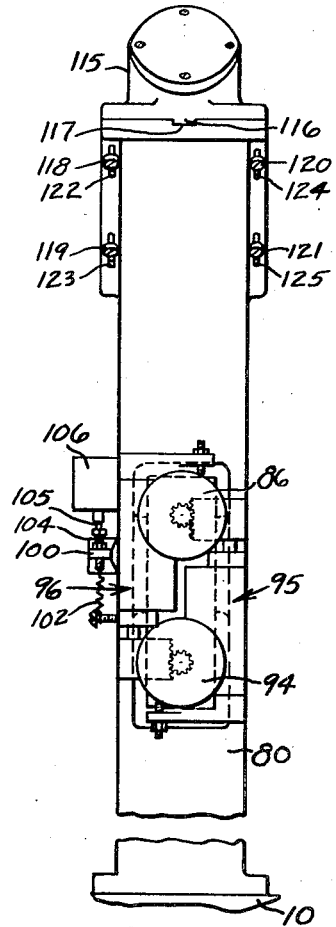
Fig. 2 is a front elevation of the steady rest and crankshaft positioning mechanism.

The machine is provided with a work steadying rest having a base 80 which may be mounted on a work table in the conventional manner, or as shown in Figs. 1 and 2 may be mounted on the base 10. The steady rest base 80 serves as a support for a pair of steady rest shoes 81 and 82 for steadying and supporting a crankpin 83 on the crankshaft 42 during a grinding operation. The steady rest shoe 81 is supported on a horizontally movable slide 84 which is slidably mounted on the steady rest base 80. An adjusting screw 85 having an actuating knob 86 is operatively connected to adjust the slide 84 to facilitate positioning the steady rest shoe 81.

The lower steady rest shoe 82 is supported on a pivotally mounted arm 87 supported on a stud 88 on the steady rest base 80. A cam 89 formed on a horizontally movable slide 90 is arranged to engage a roller 91 supported by a stud 92 on the arm 87. An adjusting screw 93 having an actuating knob 94 is provided to facilitate adjusting the position of the slide 90 and the cam 89 so as to vary the position of the arm 87 and the steady rest shoe 82 to maintain it in operative engagement with the crankpin 83 during a grinding operation. By manual manipulation of the actuating knob 86 and 94, the work steadying shoes 81 and 82 respectively may be maintained in the desired supporting relationship with the crankpin 83 being ground.

As desired, a spring and fluid pressure actuated mechanism may be provided for moving the steady rest shoes 81 and 82 automatically into and away from engagement with the crankpin 83. This mechanism may comprise a spring actuating hydraulic mechanism 95 for actuating the steady rest shoe 81 and a similar spring actuated hydraulic mechanism 96 may be provided for actuating the steady rest shoe 82 in a manner substantially the same as that shown in the prior U. S. patent to H. S. Silven No. 2,567,620, dated September 11, 1951, to which reference may be had for details of disclosure not contained herein.

A work engaging feeler 100 is pivotally mounted on a stud 101 carried by the steady rest base 80. A tension spring 102 serves normally to exert a tension on the feeler 100 tending to rock the feeler in a counter-clockwise direction. The feeler 100 is arranged in the path of the crankpin 83 to be ground so that when the crankshaft 42 is loaded into an operative position in the grinding machine, the crankpin 83 will engage the feeler 100 and rock it in a clockwise direction against the tension of the spring 102. During this rocking movement of the feeler 100, an adjusting screw 104 is arranged to engage the actuating plunger 105 of a normally open limit switch 106 to close a circuit to be hereinafter described.

In the grinding of crankpins of a crankshaft, it is desirable to position the crankshaft 42 in an axial direction so that the opposed shoulders or cheeks of the crankpin 83 will be centered relative to the side face of the grinding wheel 13 so as to equalize the side grinding of the wheel. In the preferred form, it is desirable to position the crankshaft 42 in an axial direction after it has been placed in supporting engagement with the pot chucks 47 and 48 but before the clamping jaws 51 have been moved to a clamped position. A crankshaft positioning mechanism is provided which is preferably supported on the steady rest base 80 axially to position the crankshaft 42. This mechanism preferably comprises a symmetrically shaped oval or eliptical cam 110 which is formed integral with a sleeve 111. The sleeve 111 (Fig. 1) is rotatably supported in a cylindrical bore 112 formed in an integral boss 114 on the steady rest base 80.

An actuated mechanism is provided for moving the cam 110 to and from an operative position and for rotating the cam to axially position the cam shaft 42 comprising a hydraulic cylinder 115. The cylinder 115 is provided with a tongue 116 which mates with a groove 117 formed on the upper surface of the steady rest base 80. A plurality of clamping screws 118, 119, 120, and 121 pass through elongated slots 122, 123, 124 and 125 respectively formed in the steady rest base 80 and are screw threaded into the cylinder 115. The clamping screws 118, 119, 120 and 121 serve to facilitate adjustment of the cylinder 115 and also to clamp the cylinder in adjusted position relative to the steady rest base 80.

The cylinder 115 contains a slidably mounted piston 130 which is connected to the left hand end of a piston rod 131. The piston 130 is held against rotation by means of a key 132 supported by the cylinder 115 which rides within a keyway 133 formed in the piston 130. The piston rod 131 is provided with diametrically opposed helical grooves or cams 134 and 135. The sleeve 111 is provided with diametrically opposed studs or followers 136 and 137 which ride in the helical grooves 134 and 135 respectively. A compression spring 138 is contained within a central bore 139 formed in the sleeve 111 and is interposed between the lower end of the piston rod 131 and an end anti-friction thrust bearing 140 supported by the sleeve 111 and cam 110. The combination of the spring 138 serves normally to exert pressure on the sleeve 111 tending to hold the follower studs 136 and 137 in the lower ends of the helical grooves or cams 134 and 135 respectively.

A pipe 141 is provided for conveying fluid under pressure to a cylinder chamber 142 formed in the left hand end of the cylinder 115. A cylinder chamber 143 formed at the right hand end of the cylinder 115 connects with a pipe 144.

A control valve 150 is provided for controlling the admission to and exhaust of fluid from the cylinder 115. This valve is preferably a piston type valve comprising a valve stem 151 having a plurality of spaced valve pistons 152, 153, 154 and 155 formed integrally therewith so as to form a plurality of valve chambers 156, 157, and 158. A compression spring 159 serves normally to hold the valve stem 151 in a right hand end position. A solenoid S3 is provided which when energized serves to shift the valve stem toward the left to shift the valve into a reverse position. A pair of throttle valves 160 and 161 are provided for controlling the rate of fluid exhausting through the control valve 150 and thereby serving to control the rate of movement of the piston 130.

In the position of the parts as illustrated in Fig. 5, fluid under pressure from the pipe 36 passes through the valve chamber 157, through the pipe 144 and into the cylinder chamber 143 to hold the piston 130 in an inoperative position as illustrated in Figs. 1 and 5. When the solenoid S3 is energized, the valve stem 151 is moved toward the left so that fluid under pressure from the pipe 36 enters the valve chamber 157 passes through the pipe 141 into the cylinder chamber 142 to cause the piston 130 to move the cam 110 into operative engagement with the crankpin 83 to be ground. During this movement of the piston 130 fluid within the cylinder chamber 143 exhausts through the pipe 144, through the valve chamber 158 and out through the throttle valve 161 into the common exhaust pipe 41. The setting of the throttle valve 161 serves to determine the rate of movement of the cam 110 into operative engagement with the crankpin 83 to be ground.

The cam 110 moves with the piston 130 toward the right (Fig. 1) until the end face of the cam 110 engages the peripheral face of the crankpin 83 to be ground.

Figure 3:
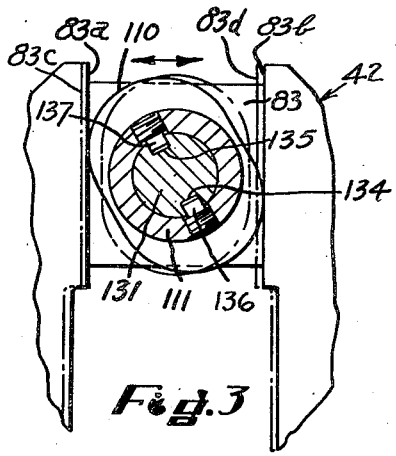
Fig. 3 is a cross sectional view, on an enlarged scale, taken approximately on the line 3—3 of Figure 1, through the crankshaft position mechanism.

During this movement of the cam 110 the cam is in the broken line position 110a (Fig. 3). After the cam moves into operative contact with the periphery of the crankpin 83, continued movement of the piston 130 toward the right serves through the helical grooves or cams 134 and 135 to impart a rotary motion to the cam 110 in a counter-clockwise direction (Fig. 3) so that the cam periphery will engage one or the other of the cheeks 83a or 83b of the crankpin 83 depending upon the axial position of the crankshaft 42. As illustrated in Fig. 3, the cheeks of the crankpin 83 are illustrated by broken lines 83c and 83d. The counter-clockwise rotation of the cam 110 causes the cam periphery to first engage the cheek 83d and to move the crankshaft 42 axially toward the right until the cam periphery moves the cheek 83d into position 83b and the cam periphery engages the opposed cheek 83a. The axis of rotation of the cam 110 is located in a mid-plane between the side face of the grinding wheel 13 so that when the cam 110 rotates so that its periphery moves the crankshaft axially so that the cam periphery engages both of the cam cheeks 83a and 83b, the cheeks 83a and 83b will be centered relative to the operative face of the grinding wheel 13 thereby serving to equalize the grinding on the opposed cheeks as the grinding wheel is fed into operative grinding engagement with the crankpin 83.

An electrical control apparatus has been illustrated in Fig. 5 including a main switch 165, an electric timer 166 and an electrical timer 167.

The operation of this improved crankpin positioning mechanism will be readily apparent from the foregoing disclosure. The main switch 165 is first closed after which the crankshaft 42 is positioned in supporting engagement in the half bearing 50 of the pot chucks 47 and 48. The loading of the crankshaft 42 into this position, the periphery of the crankpin 83 engages the feeler arm 100 and rocks it in a clockwise direction to close the normally open limit switch 106. The closing of the limit switch 106 serves to energize the timer 166 so as to energize the solenoid S3 thereby shifting the control valve 150 so as to admit fluid under pressure to the cylinder chamber 142 to move the piston 130 so as to move the cam 110 into engagement with the periphery of the crankpin 83 to be ground. As above explained, the cam 110 engages the periphery of the crankpin 83 and then rotates in a clockwise direction to position the crankshaft 42 axially so that the cheeks 83a and 83b of the crankpin 83 are centered relative to the operative face of the grinding wheel 13. The timer 166 is set for a relatively short cycle sufficient to axially position the crankshaft 42, after which the timer 166 times out and is connected to energize the timer 167. Energizing the timer 167 serves to close a circuit to energize the solenoids S1 and S2 so as to shift the control valves 65 and 25. Energizing the solenoid S1 serves to actuate the clamping jaw 51 on both of the pot chucks 47 and 48 to clamp the crankshaft 42 in adjusted position for grinding the crankpin 83. Energization of the solenoid S2 shifts the control valve 25 so as to admit fluid under pressure to the cylinder chamber 39 to move the piston 22 forward thereby imparting a forward approaching movement to the wheel slide 11 and the grinding wheel 13 to grind the pin 83 and the adjacent shoulders or cheeks 83a and 83b to the desired and predetermined extent. After the timer 167 times out, the solenoids S1 and S2 are simultaneously deenergized so as to unclamp the pot chucks 47 and 48 and to cause a rearward movement of the wheel slide 11 and grinding wheel 13 to an inoperative position. The ground crankshaft 42 may then be removed from the pot chucks 47 and 48 thereby releasing the tension of the spring 102 which swings the feeler 100 in a counter-clockwise direction to open the normally open limit switch 106 thereby permitting the timers 166 and 167 to reset for the next cycle of operation.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a transversely movable rotatable grinding wheel thereon, means to feed said wheel transversely in either direction, a work support on said base including a pair of spaced axially aligned rotatable pot chucks for supporting and rotating a work piece to be ground, and a work positioning mechanism including a rotatable cam engageable with a portion of the work piece to be ground to position the work piece axially relative to said chucks, said work positioning mechanism being located so that the axis of rotation of the cam is in the mid-plane of said grinding wheel, means to impart an axial and a rotary motion to said cam to move said cam into engagement with the portion of the work piece to be ground and thereafter to rotate said cam so as to cause an axial positioning movement of the work piece relative to the pot chucks to center the portion of the work piece to be ground relative to the operative face of the grinding wheel.

2. In a grinding machine as claimed in claim 1, in combination with the parts and features therein specified in which the means for moving the cam consists of a piston and cylinder to move said rotatable cam into and out of operative engagement with the work piece to be ground, and means including a cam and follower interposed between the piston and rotatable cam to impart a rotary motion to said cam after it moves into engagement with the portion of the work piece to be ground axially to position the work piece relative to the operative face of the grinding wheel.

3. In a grinding machine, as claimed in claim 1, in combination with the parts and features therein specified in which the means for moving the cam consists of a piston and cylinder operatively connected to move said cam into yielding engagement with the portion of the work piece to be ground, and a cam mechanism interposed between said piston and said rotatable cam thereafter to rotate said cam into operative engagement with shouldered faces on the portion of the work to be ground to position the work piece axially relative to the pot chucks and the operative face of the grinding wheel.

4. In a grinding machine having a base, a transversely movable rotatable grinding wheel thereon, means to feed said wheel transversely in either direction, a work support on said base including a pair of spaced axially aligned rotatable pot chucks for supporting and rotating a work piece to be ground, and a work positioning mechanism including a cylinder, a non-rotatable piston therein, a rotatable cam slidably supported relative to said piston, yieldable connections between said cam and said piston, and a cam and follower mechanism interposed between the piston and cam, said piston serving to move said rotatable cam into yielding engagement with a portion of the work piece to be ground and thereafter to rotate said cam axially to position the work piece relative to the operative face of the grinding wheel.

5. In a grinding machine having a base, a transversely movable rotatable grinding wheel thereon, means including a piston and cylinder to feed said wheel transversely, a work support on said base including a pair of spaced axially aligned rotatable pot chucks for supporting and rotating a work piece to be ground, a pivotally mounted clamping jaw on each of said chucks, a piston and cylinder on each of said chucks for actuating said jaws, a work steady rest on said base having a steady rest frame, a work positioning mechanism on said frame including a rotatable cam, means including a piston and cylinder to move said cam to and from operative engagement with the work base to be ground, a piston rod fixedly mounted to one end of said piston, means including a key to hold said piston against rotation, a sleeve slidably mounted on the other end of said piston rod, a cam formed integral with the end of said sleeve, a pair of diametrically arranged helical grooves formed in the peripheral surface of said piston rod, a pair of diametrically arranged follower studs fixedly mounted within said sleeve and engageable with said grooves, and a compression spring within said sleeve and interposed between the end of the piston rod and the cam normally to maintain said sleeve with the studs in the lower ends of said grooves, said piston serving to move the cam into engagement with a portion of the work piece to be ground and thereafter to cause a rotary motion of said sleeve and cam axially to position the work piece relative to the operative face of the grinding wheel.

6. In a grinding machine as claimed in claim 5, in combination with the parts and features therein specified of a solenoid-actuated control valve for controlling the admission to and exhaust of fluid from the wheel slide cylinder, a second solenoid-actuated control valve for controlling the admission to and exhaust of fluid from the pot chuck cylinders, a third solenoid-actuated control valve for controlling the admission to and exhaust of fluid from the work positioning cylinder, a work engaging feeler, a limit switch actuated thereby, and an electric timer control for said switch, said timer serving to energize said third control valve to actuate said rotatable cam to position a work piece relative to the grinding wheel, said timer serving at time-out to energize the first and second control valves to clamp a work piece in said pot chucks and to start an approaching movement of the grinding wheel.

References Cited in the file of this patent

UNITED STATES PATENTS

| Number | Name | Date |
|---|---|---|
| 1,957,568 | Wills | May 8, 1934 |
| 2,618,909 | Hill | Nov. 25, 1952 |
| 2,638,719 | Balsiger | May 19, 1953 |
| 2,650,522 | Godfriaux | Sept. 1, 1953 |